(12) United States Patent
Takeda et al.

(10) Patent No.: US 10,839,517 B2
(45) Date of Patent: Nov. 17, 2020

(54) MULTIPLE NEURAL NETWORKS-BASED OBJECT SEGMENTATION IN A SEQUENCE OF COLOR IMAGE FRAMES

(71) Applicant: SONY CORPORATION, Tokyo (JP)

(72) Inventors: Hiroyuki Takeda, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 67 days.

(21) Appl. No.: 16/281,353

(22) Filed: Feb. 21, 2019

(65) Prior Publication Data
US 2020/0273176 A1 Aug. 27, 2020

(51) Int. Cl.
*G06K 9/34* (2006.01)
*G06T 7/11* (2017.01)
(Continued)

(52) U.S. Cl.
CPC .............. *G06T 7/11* (2017.01); *G06K 9/3233* (2013.01); *G06K 9/6267* (2013.01);
(Continued)

(58) Field of Classification Search
None
See application file for complete search history.

(56) References Cited

U.S. PATENT DOCUMENTS 5,926,190 A * 7/1999 Turkowski ............. G06T 7/33
345/473
6,192,079 B1 * 2/2001 Sharma ............... H04N 19/587
375/240.16

(Continued)

FOREIGN PATENT DOCUMENTS

WO 2017/040691 A1 3/2017
WO WO-2017040691 A1 * 3/2017 ......... G06K 9/00637
WO 2018/042388 A1 3/2018

OTHER PUBLICATIONS

V-Net Fully convolutional networks—Segmentation, Fausto Milletari et al., IEEE, 978-1-5090-5407-7, 2016, pp. 565-571 (Year: 2016).*

(Continued)

*Primary Examiner* — Jayesh A Patel
(74) *Attorney, Agent, or Firm* — Chip Law Group

(57) ABSTRACT

An image processing apparatus and method for object segmentation in color image frames, is provided. The image-processing apparatus generates, based on a first neural network model, a first foreground mask and a second foreground mask for an object-of-interest in a first color image frame and an upcoming color image frame, respectively, of the sequence of color image frames. The image-processing apparatus determines a third foreground mask based on interpolation of the first foreground mask and the second foreground mask and updates, by use of the second neural network model, the third foreground mask to a fourth foreground mask. The image processing apparatus segments the object-of-interest from at least the first color image frame, the upcoming color image frame, and the intermediate color image frame by use of the first foreground mask, the second foreground mask, and the fourth foreground mask, respectively.

20 Claims, 7 Drawing Sheets

(51) Int. Cl.
  *G06N 3/04* (2006.01)
  *G06K 9/62* (2006.01)
  *G06K 9/32* (2006.01)

(52) U.S. Cl.
  CPC .. *G06N 3/0454* (2013.01); *G06T 2207/10024* (2013.01); *G06T 2207/20081* (2013.01); *G06T 2207/20084* (2013.01)

(56) References Cited

U.S. PATENT DOCUMENTS

| | | | | |
|---|---|---|---|---|
| 6,771,834 | B1* | 8/2004 | Martins | G06T 7/11 382/173 |
| 6,870,945 | B2* | 3/2005 | Schoepflin | G06T 7/254 348/169 |
| 7,440,613 | B2* | 10/2008 | Xu | H04N 19/21 375/240.16 |
| 10,477,220 | B1* | 11/2019 | Takeda | G06T 7/143 |
| 2003/0044045 | A1* | 3/2003 | Schoepflin | G06T 7/12 382/103 |
| 2010/0302376 | A1* | 12/2010 | Boulanger | G06K 9/34 348/164 |
| 2016/0321809 | A1* | 11/2016 | Chukka | G06T 7/33 |
| 2017/0287137 | A1 | 10/2017 | Lin et al. | |
| 2018/0232887 | A1 | 8/2018 | Lin et al. | |
| 2019/0180454 | A1* | 6/2019 | Choudhury | G06T 7/13 |
| 2019/0327475 | A1* | 10/2019 | Takeda | G06T 7/143 |
| 2019/0392550 | A1* | 12/2019 | Uchiyama | G06T 7/194 |

OTHER PUBLICATIONS

International Search Report and Written Opinion of PCT Application No. PCT/IB2020/051393, dated Apr. 8, 2020, 10 pages of ISRWO.
Koreva, et al., "Learning Video Object Segmentation from Static Images", Cornell University, Computer Vision and Pattern Recognition, XP081152569, Dec. 2016, 16 pages.
Olavi Stenroos, "Object Detection from Images Using Convolutional Neural Networks", Master's Thesis Espoo, Jul. 28, 2017, 75 pages.
Andrews Sobral, "BGSLibrary: An OpenCV C++ Background Subtraction Library," 7 pages, Jun. 2013.
Lecun, et al., "Gradient Based Learning Applied to Document Recognition" Proceedings of the IEEE, vol. 86, Nov. 1998, 46 pages.
Long, et al.,"Fully Convolutional Networks for Semantic Segmentation", 10 pages, Nov. 2014.
"Segmentation Results: VOC2012", PASCAL 2 Pattern Analysis, Statistical Modelling and Computational Learning, 9 pages, Feb. 2019.
Bouwmans, et al., "Background Modeling using Mixture of Gaussians for Foreground Detection—A Survey", Recent Patents on Computer Science, Bentham Science Publishers, 2008, 1 (3), pp. 219-237.
B. W. Silverman, "Density Estimation for Statistics and Data Analysis", Monographs on Statistics and Applied Probability, London: Chapman and Hall, 1986.
He, et al., "Mask R-CNN", 12 pages, Jan. 2018.

\* cited by examiner

US 10,839,517 B2

MULTIPLE NEURAL NETWORKS-BASED OBJECT SEGMENTATION IN A SEQUENCE OF COLOR IMAGE FRAMES

CROSS-REFERENCE TO RELATED APPLICATIONS/INCORPORATION BY REFERENCE

None.

FIELD

Various embodiments of the disclosure relate to learning-based image processing, computer vision, and camera technologies. More specifically, various embodiments of the disclosure relate to an image-processing apparatus and method for object segmentation in a sequence of color image frames based on multiple neural networks.

BACKGROUND

Developments in the field of image processing, computer vision, and camera technologies have led to advancements in various image processing systems and techniques, such as object segmentation. A conventional object segmentation apparatus may segment an object-of-interest (such as a human body or a human face) from an image of a scene based on different object segmentation techniques. Examples of such object segmentation techniques may include a compression-based, color-based, depth-based, histogram-based, semantic segmentation-based, or scene parsing-based object segmentation technique.

Currently, in one of the conventional color-based segmentation approach, the object-of-interest may be segmented from a captured image based on removal of a pre-determined static background image from the captured image. However, in order to generate the pre-determined static background image, the conventional object segmentation apparatus may need to first capture a sequence of images of the scene when the object-of-interest is not present in the scene, which may be undesirable. The pre-determined static background image of the scene may be generated from the captured sequence of images. The conventional background image removal approach may further require capture of the sequence of images from the scene with a static camera. Any slight movement or disturbance in camera position may require a re-estimation of the static background image.

In another conventional depth-based approach, the conventional object segmentation apparatus may segment the object-of-interest by using a depth image which may be captured by a depth sensor. In cases where the depth sensor captures a noisy depth image that comprises invalid depth values, the conventional object segmentation apparatus may segment the object-of-interest from the captured image erroneously and inaccurately. Other conventional semantic segmentation or scene parsing-based object segmentation techniques typically fall into two categories. The first category utilizes only color images and are comparatively accurate but too slow to process and segment objects. This may in turn make such conventional semantic segmentation or scene parsing-based object segmentation techniques infeasible for practical use, and the second category is comparatively faster but inaccurate.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image-processing apparatus and method for object segmentation in a sequence of color image frames based on multiple neural networks is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various implementations may be found in an image-processing apparatus and method for object segmentation in a sequence of color image frames based on multiple neural networks. Exemplary aspects of the disclosure may include an image-processing apparatus that may be configured to utilize multiple neural network models, such as a first neural network model and a second neural network model, to segment an object-of-interest, such as a human object, from a sequence of color image frames. The first neural network model may be a pre-trained model, such as a convolutional neural network (CNN). Typically, preparation of the training dataset for a neural network, such as a CNN is cumbersome because accurate outputs are usually created manually for the training dataset. Thus, once the first neural network model is available, a training dataset for the second neural network model may be generated based on an input-output image pair of the first neural network model and different videos without the need to manually create the true foreground masks, also referred to as ground truth for the second neural network model.

In contrast with conventional approaches, the disclosed image-processing apparatus precisely segments the object-of-interest that may be a deforming or a moving object in real time or near real time from the sequence of color image frames. The two different neural network models employed in the segmentation of the object-of-interest from the sequence of color image frames may ensure a minimum segmentation error and improve a processing speed per frame to segment the object-of-interest from the sequence of color image frames as compared to the conventional approaches for object segmentation.

Figure 1:
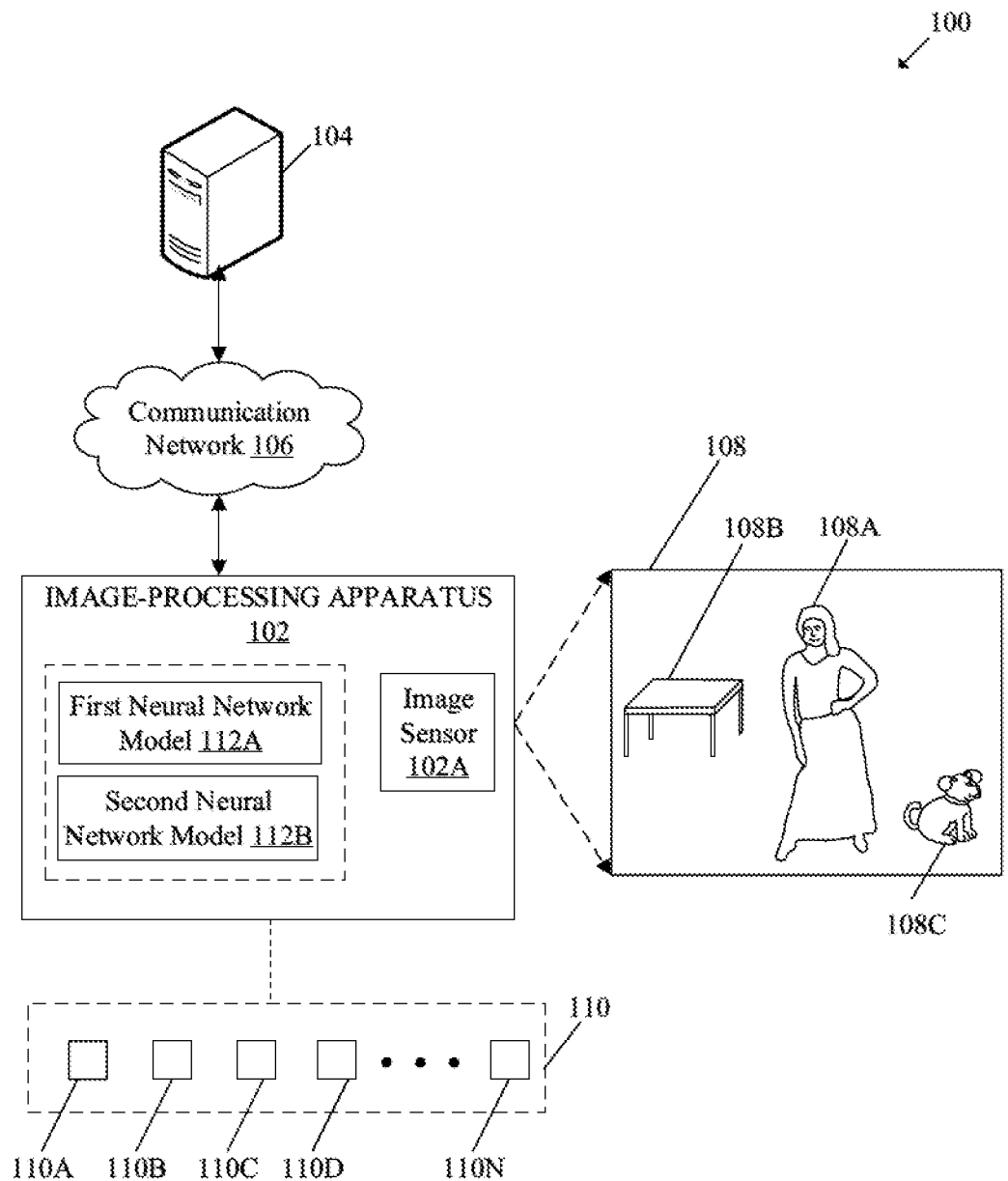
FIG. 1 is a block diagram that illustrates a network environment for an image-processing apparatus for object segmentation in a sequence of color image frames based on multiple neural networks, in accordance with an embodiment of the disclosure.

FIG. 1 is a block diagram that illustrates a network environment for an image-processing apparatus for object segmentation in a sequence of color image frames based on multiple neural networks, in accordance with an embodiment of the disclosure. With reference to FIG. 1, there is shown a network environment 100. The network environment 100 may include an image-processing apparatus 102 and a server 104. The image-processing apparatus 102 may include one or more sensors, such as an image sensor 102A. The image-processing apparatus 102 may be communicatively coupled to the server 104, via a communication network 106. There is further shown a scene 108 that includes a plurality of objects, such as a human object 108A, an inanimate object 108B (e.g., a furniture item), and an animate object 108C (e.g., an animal). The image sensor 102A may be configured to capture a sequence of color image frames 110 of the scene 108 from a field-of-view of the image-processing apparatus 102. The image-processing apparatus 102 may further include a first neural network model 112A and a second neural network model 112B.

The image-processing apparatus 102 may comprise suitable logic, circuitry, interfaces, and/or code that may be configured to receive the sequence of color image frames 110 from the image sensor 102A. The image-processing apparatus 102 may be further configured to segment an object-of-interest, such as the human object 108A, from the sequence of color image frames 110. The functionalities of the image-processing apparatus 102 may be implemented in portable devices, such as a high-speed computing device, or a camera, and/or non-portable devices, such as the server 104. Examples of the image-processing apparatus 102 may include, but are not limited to, a digital camera, a digital camcorder, a camera phone, a smart phone, a virtual reality device, a gaming console, a mobile device, or a hardware video player. Other examples of the image-processing apparatus 102 may include, but are not limited to a television, a home entertainment system, an augmented reality device, and a smart wearable (such as a smart glass).

The image sensor 102A may include suitable logic, circuitry, interfaces, and/or code that may be configured to capture the sequence of color image frames 110 of the scene 108. The sequence of color image frames 110 may be captured in at least one color model, such as a Red, Green and Blue (RGB) color model, Hue, Saturation and Brightness (HSB) color model, Cyan Yellow Magenta and black (CYMK) color model, or LAB color model (in which L stands for Luminance and A and B are chromatic components). The image sensor 102A may have suitable optical instruments such as focusing lenses which may focus the scene 108 and/or a particular object-of-interest in the scene 108. Examples of implementation of the image sensor 102A may include, but are not limited to a semiconductor charged coupled device (CCD) based image sensor, a Complementary metal-oxide-semiconductor (CMOS) based image sensor, a backlit CMOS sensor with global shutter, a silicon-on-insulator (SOI)-based single-chip image sensor, an N-type metal-oxide-semiconductor based image sensor, a flat panel detector, or other image sensors. In some embodiments, a depth sensor in addition to the image sensor 102A may be used to capture a sequence of depth images corresponding to the sequence of color image frames 110 of the scene 108. In some embodiments, the image sensor 102A may be integrated within the image-processing apparatus 102. In some embodiments, the image sensor 102A may not be integrated within the image-processing apparatus 102. In such cases, the image sensor 102A may be communicatively coupled with the image-processing apparatus 102, via various wired and wireless communication protocols.

The server 104 may comprise suitable logic, circuitry, and interfaces that may be configured to store training data for a neural network model, such as the first neural network model 112A and/or the second neural network model 112B. Examples of the server 104 may include, but are not limited to a database server, a file server, a web server, a cloud server, an application server, a mainframe server, or other types of server.

The communication network 106 may include a communication medium through which the image-processing apparatus 102 and the server 104 may communicate with each other. Examples of the communication network 106 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 106, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The first neural network model 112A and the second neural network model 112B may be provided in the image-processing apparatus 102. In accordance with an embodiment, the first neural network model 112A may be a first convolutional neural network (CNN) and the second neural network model 112B may be a second CNN that may be different from the first CNN. Other examples of the first neural network model 112A and the second neural network model 112B may include a machine learning model, a deep learning model, such as a recurrent neural network (RNN), the CNN, or a Long Short Term Memory (LSTM)-based RNN, a Connectionist Temporal Classification (CTC)-based RNN, or a Generative Adversarial Network (GAN). In some embodiments, at least one of the first neural network model 112A or the second neural network model 112B may be implemented as a specialized neural network circuitry in the image-processing apparatus 102. In some embodiments, the first neural network model 112A or the second neural network model 112B may be stored as a neural schema or an artificial intelligence (AI)-based application(s) in the image-processing apparatus 102.

In accordance with an embodiment, the first neural network model 112A may be a pre-trained model. The first neural network model 112A may be trained with a set of image pairs prior to deployment at the image-processing apparatus 102. Each image pair of the set of image pairs may include a color image frame and a foreground mask image. Each image pair may include at least an object-of-interest that is to be segmented. In one example, the server 104 may be configured to store the first neural network model 112A. The server 104 may be configured to train the first neural network model 112A with the set of image pairs by use of a test video of a test scene.

The first neural network model 112A may include a neural schema having a plurality of interconnected processing units arranged in multiple layers, such as an input layer, one or more hidden layers, and an output layer. Each processing unit in a layer may be interconnected with different connection strengths or parameters, also known as weights.

During training of the first neural network model 112A, an input color image of the set of image pairs may be passed through the first neural network model 112A via the input layer. In some cases, one or more features that defines the characteristics of the object-of-interest may also be provided in the input layer. An output of an initial foreground mask image may be generated by the output layer. In case, an inaccurate output of the foreground mask image is generated at the initial stages of the training by the first neural network model 112A, an accurate foreground mask image may be provided to the first neural network model 112A. The accurate foreground mask (also known as true foreground mask image) may then be compared with previous output of the first neural network model 112A. The difference as a result of the comparison of the accurate foreground mask with the previous output of the first neural network model 112A may be passed back to the first neural network model 112A. The weights may be adjusted accordingly next time. Thus, the preparation of the training dataset for CNN is usually cumbersome.

In some cases, the true outputs, such as the true foreground mask images, are usually manually created. However, as training progresses by use of different color image frames (e.g., RGB input frames) of the test video, the first neural network model 112A may learn and become capable of generating accurate output of the foreground mask image for the object-of-interest on which it is trained. For example, in case the object-of-interest is a human-shaped object, the first neural network model 112A once trained may predict and output an accurate foreground mask image for an arbitrary input color image frame of the test video or a new video having a human-shaped object. The number of processing units in the plurality of interconnected processing units may not only define computational complexity of a neural network, such as the first CNN, but also contribute to maintain accuracy related to output of the neural network. The higher the number of processing units, the higher would be the computational complexity. The first neural network model 112A (e.g., the first CNN) may be a computationally-heavy CNN as compared to the second neural network model 112B. The training of the first neural network model 112A may be a one-time activity. The first neural network model 112A once trained may be used and/or deployed in various electronic devices, such as the image-processing apparatus 102, for object segmentation purposes.

In operation, the image sensor 102A may be configured to capture the sequence of color image frames 110 of the scene 108. In some embodiments, the image-processing apparatus 102 may be configured to receive the first neural network model 112A and the second neural network model 112B from the server 104. In some embodiments, the first neural network model 112A and the second neural network model 112B may be pre-installed and/or preconfigured in the image-processing apparatus 102.

The image-processing apparatus 102 may be further configured to generate, based on the first neural network model 112A, a first foreground mask for an object-of-interest, such as the human object 108A, in a first color image frame 110A of the sequence of color image frames 110. The image-processing apparatus 102 may be configured to utilize the first neural network model 112A to estimate a foreground mask, such as the first foreground mask, of the object-of-interest from an arbitrary input color image frame from the sequence of color image frames 110. The foreground mask, such as the first foreground mask, estimation may be independent of image information from one or more preceding color image frames or succeeding color image frames of the arbitrary input color image. Alternatively stated, the first neural network model 112A (e.g., the first CNN that is a pre-trained model) may not require any reference frames to generate different foreground masks, such as the first foreground mask, for the object-of-interest.

The image-processing apparatus 102 may be further configured to generate, based on the first neural network model 112A, a second foreground mask for the object-of-interest, such as the human object 108A, in an upcoming color image frame that is non-adjacent to the first color image frame 110A of the sequence of color image frames 110. For example, the upcoming color image frame that is non-adjacent to the first color image frame 110A may be a third color image frame 110C of the sequence of color image frames 110.

The image-processing apparatus 102 may be further configured to determine a third foreground mask based on interpolation of the first foreground mask and the second foreground mask. In accordance with an exemplary embodiment, the interpolation may be a linear interpolation of the first foreground mask and the second foreground mask. In accordance with an alternate embodiment, the interpolation may be a non-linear interpolation of the first foreground mask and the second foreground mask. There may be different interpolation techniques that may be implemented by the image-processing apparatus 102 to determine the third foreground mask. Examples of the linear interpolation techniques may include, but are not limited to, averaging-based interpolation, bilinear interpolation, a linear spline interpolation, and other linear polynomial interpolations. Examples of non-linear interpolation techniques may include, but are not limited to, a cosine interpolation and other non-linear polynomial interpolations.

In linear interpolation, an average of two mask frames, such as the first foreground mask and the second foreground mask, may be taken as a rough foreground mask, which may be the third foreground mask. In accordance with an embodiment, the image-processing apparatus 102 may be further configured to apply an approximation operation in which an object boundary of the object-of-interest is approximated and normalized from a first object boundary of the first foreground mask and a second object boundary of the second foreground mask to generate the third foreground mask.

In accordance with an embodiment, the image-processing apparatus 102 may be further configured to update the third foreground mask to a fourth foreground mask that represents a refined foreground mask of the third foreground mask by use of the second neural network model 112B. The second neural network model 112B may be different from the first neural network model 112A in at least a cycle time parameter. The cycle time parameter indicates a total time to generate an output foreground mask for an input color image frame of the sequence of color image frames 110 when the input color image frame is passed through a neural network model, such as the first neural network model 112A or the second neural network model 112B. The second neural network model 112B may have less cycle time and may be faster as compared to the first neural network model 112A. Thus, the second neural network model 112B may also be referred to as a computationally-light CNN that may output as accurate masks as the computationally-heavy CNN, such as the first neural network model 112A (e.g., the first CNN).

The image-processing apparatus 102 may be further configured to train the second neural network model 112B based on an input-output image pair of the first neural network model 112A such that a difference between the refined foreground mask generated by use of the second neural network model 112B and the foreground mask generated by first neural network model 112A (e.g., the first computationally-heavy CNN) is minimized. The fourth foreground mask may be generated based on an intermediate color image frame (such as a second color image frame 110B) and the determined third foreground mask. The intermediate color image frame (such as a second color image frame 110B) may lie between the first color image frame 110A and the upcoming color image frame (such as the third color image frame 110C).

The image-processing apparatus 102 may be further configured to segment the object-of-interest from at least the first color image frame 110A by use of the first foreground mask and the upcoming color image frame (such as the third color image frame 110C) by use of the second foreground mask. The image-processing apparatus 102 may be further configured to segment the object-of-interest from the intermediate color image frame (such as a second color image frame 110B) by use of the fourth foreground mask. Thus, different output foreground masks corresponding to each frame of a first set of non-consecutive frames (e.g., the first color image frame 110A, the third color image frame 110C, and every other non-adjacent image frames of the sequence of color image frames 110) may be generated based on the first neural network model 112A.

The image-processing apparatus 102 may be further configured to segment the object-of-interest, such as the human object 108A, from the first set of non-consecutive frames of the sequence of color image frames 110 by use of the different output foreground masks corresponding to each frame of the first set of non-consecutive frames. Similarly, different output foreground masks corresponding to each frame of a second set of non-consecutive frames (e.g., the second color image frame 110B, and every other intermediate image frame of the sequence of color image frames 110 that are non-adjacent to each other) may be generated based on the second neural network model 112B. The image-processing apparatus 102 may be further configured to segment the object-of-interest, such as the human object 108A, from the second set of non-consecutive frames of the sequence of color image frames 110 by use of the different output foreground masks corresponding to each frame of the second set of non-consecutive frames.

Figure 2:
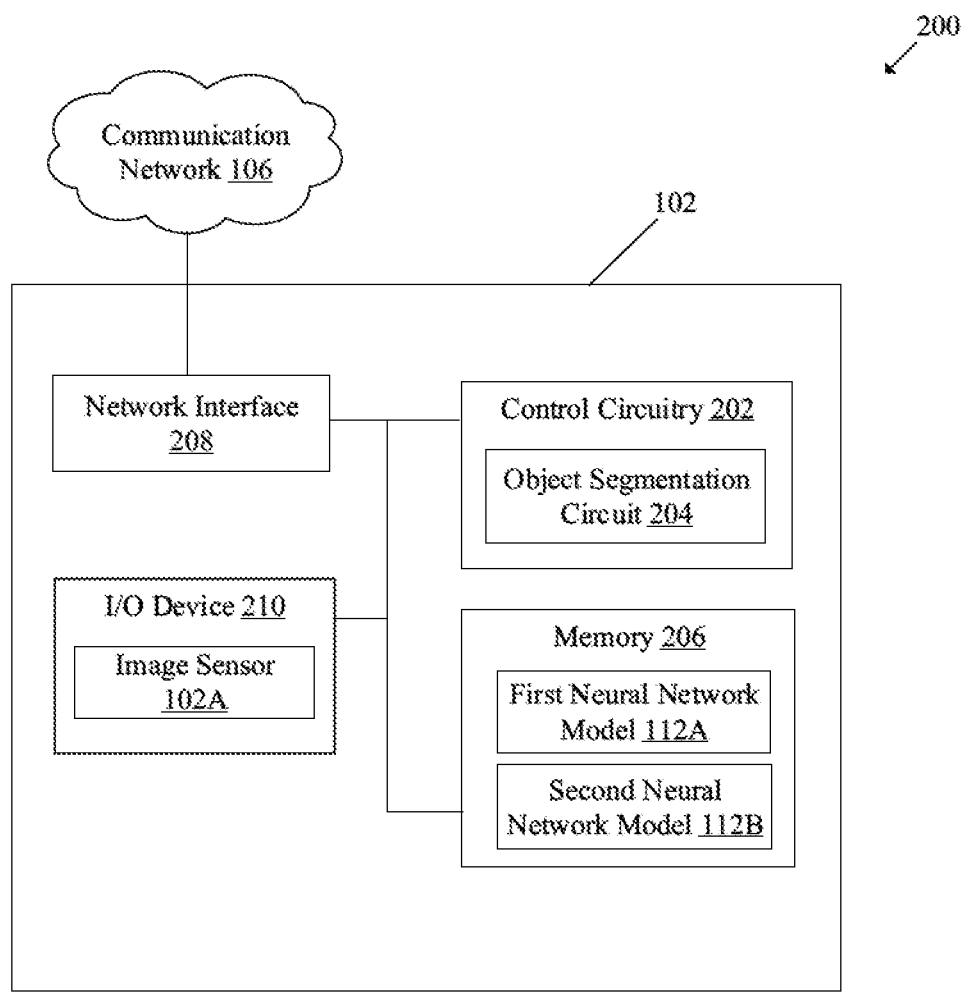
FIG. 2 is a block diagram that illustrates an exemplary image-processing apparatus for object segmentation in a sequence of color image frames based on multiple neural networks, in accordance with an embodiment of the disclosure.

FIG. 2 is a block diagram that illustrates an exemplary image-processing apparatus for object segmentation in a sequence of color image frames based on multiple neural networks, in accordance with an embodiment of the disclosure. FIG. 2 is explained in conjunction with elements from FIG. 1. With reference to FIG. 2, there is shown a block diagram 200 of the image-processing apparatus 102. The image-processing apparatus 102 may include control circuitry 202. The control circuitry 202 may include one or more specialized processing units, such as an object segmentation circuit 204. The image-processing apparatus 102 may further include a memory 206, a network interface 208, and one or more input/output (I/O) devices, such as an I/O device 210. The image-processing apparatus 102 may further include the image sensor 102A. The memory 206 may be configured to store the first neural network model 112A and the second neural network model 112B. In some embodiments, the first neural network model 112A and the second neural network model 112B may be implemented in conjunction with AI accelerator circuits in the image-processing apparatus 102.

The control circuitry 202 may comprise suitable logic, circuitry, interfaces, and/or code that may be configured to segment the object-of-interest from each of the sequence of color image frames 110. The control circuitry 202 may be communicatively coupled to the object segmentation circuit 204, the memory 206, the network interface 208, the I/O device 210, and neural network models, such as the first neural network model 112A and the second neural network model 112B. In some embodiments, the control circuitry 202 may be implemented based on a number of processor technologies known in the art. Examples of implementations of the control circuitry 202 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The object segmentation circuit 204 may comprise suitable logic, circuitry, interfaces, and/or code that may be configured to segment an object-of-interest from the sequence of color image frames 110 by use of different neural network models, such as the first neural network model 112A and the second neural network model 112B. Examples of implementations of the object segmentation circuit 204 may be a coprocessor, a Graphics Processing Unit (GPU), a central processing unit (CPU), a Reduced Instruction Set Computing (RISC) processor, an Application-Specific Integrated Circuit (ASIC) processor, a Complex Instruction Set Computing (CISC) processor, a microcontroller, and/or other control circuits.

The memory 206 may comprise suitable logic, circuitry, and/or interfaces that may be configured to store instructions executable by the control circuitry 202 and the object segmentation circuit 204. The memory 206 may be configured to store the received sequence of color image frames 110 from the image sensor 102A. The memory 206 may include the first neural network model 112A and the second neural network model 112B. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 208 may comprise suitable logic, circuitry, interfaces, and/or code that may be configured to connect and communicate with a plurality of electronic devices, such as a computer, a smartphone, or the server 104. The network interface 208 may be configured to implement known technologies to support wireless communication. The network interface 208 may include, but are not limited to an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The I/O device 210 may comprise suitable logic, circuitry, interfaces, and/or code that may be configured to receive an input from one or more users. The I/O device 210 may be further configured to provide an output to the one or more users. The I/O device 210 may comprise various input and output devices that may be configured to communicate with the control circuitry 202. Examples of the input devices may include, but are not limited to, a touch screen, physical input buttons, a joystick, a microphone, an image-capture device (such as the image sensor 102A), and/or a docking station. Examples of the output devices may include, but are not limited to, an-inbuilt display screen, a touch screen display, and/or a speaker. The operation of the control circuitry 202 may be described in details, for example, in FIGS. 3A, 3B, 3C, and 3D.

Figure 3A:
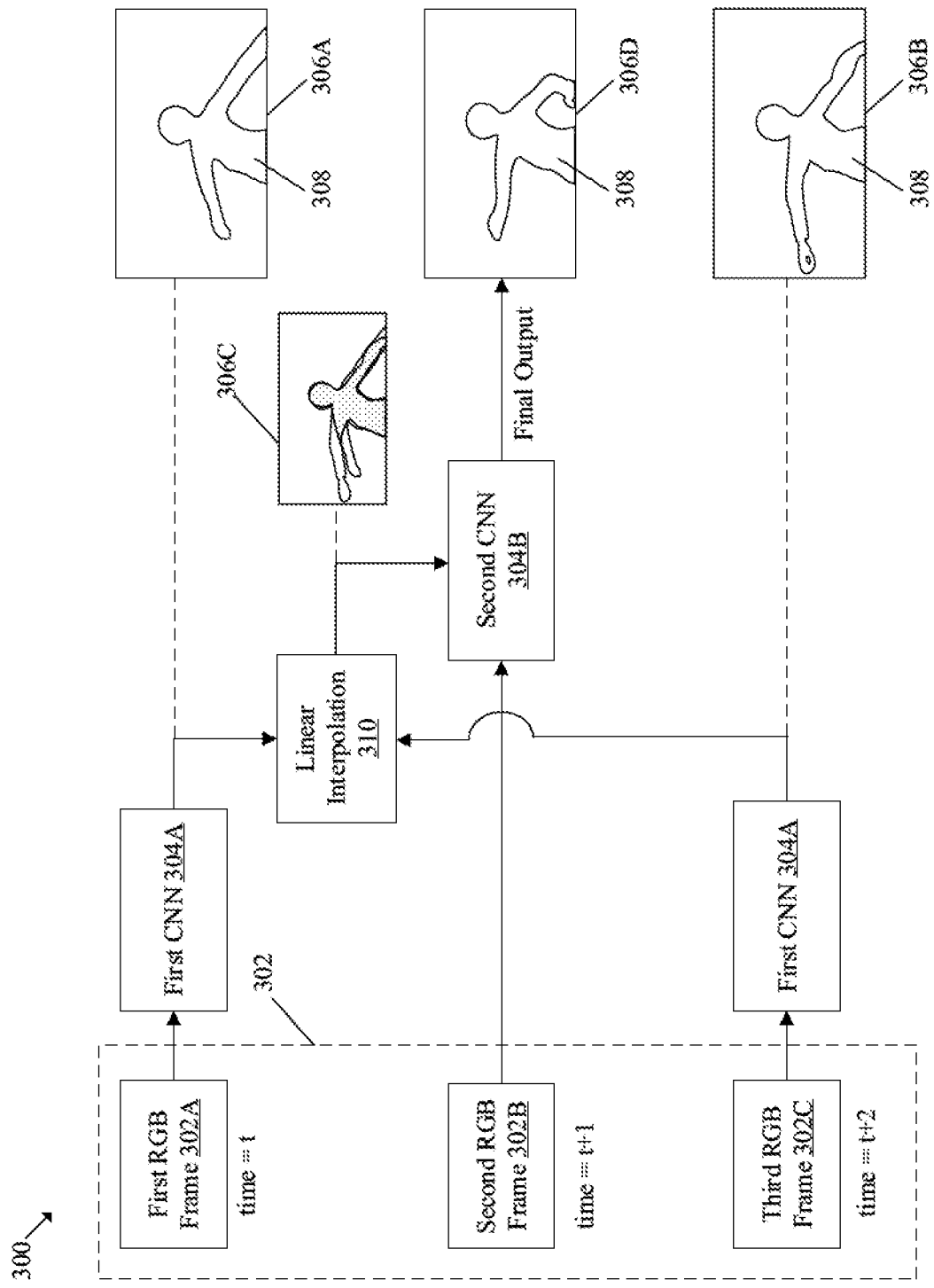
FIG. 3A illustrates an exemplary processing pipeline for object segmentation from a sequence of color image frames based on two convolutional neural networks (CNNs), in accordance with an embodiment of the disclosure.

FIG. 3A illustrates an exemplary processing pipeline for object segmentation from a sequence of color image frames based on two convolutional neural networks (CNNs), in accordance with an embodiment of the disclosure. With reference to FIG. 3A, there is shown a processing pipeline 300. In the processing pipeline 300, there is shown a set of operations that are described herein.

In operation, the image sensor 102A may be configured to capture a sequence of color image frames 302 that may include one or more objects. Alternatively, the control circuitry 202 may be configured to retrieve the sequence of color image frames 302 stored in the memory 206. The sequence of color image frames 302 may include a first RGB frame 302A, a second RGB frame 302B, and a third RGB frame 302C. The memory 206 may be further configured to store a first CNN 304A and a second CNN 304B. The first CNN 304A and the second CNN 304B may correspond to the first neural network model 112A and the second neural network model 112B, respectively. Similarly, the first RGB frame, the second RGB frame, and the third RGB frame may correspond to the first color image frame 110A, the second color image frame 110B, and the third color image frame 110C, respectively, of the sequence of color image frames 110.

The control circuitry 202 may be configured to generate the first foreground mask 306A for an object-of-interest, such as a human object 308, in a first color image frame (such as the first RGB frame 302A) of the sequence of color image frames 302. The first RGB frame 302A may be passed through the first CNN 304A, which may be a trained CNN to generate the first foreground mask 306A. The control circuitry 202 may be further configured to generate, based on the first neural network model 112A, the second foreground mask 306B for the object-of-interest, such as the human object 308, in an upcoming color image frame (such as the third RGB frame 302C). The upcoming color image frame (such as the third RGB frame 302C) may be non-adjacent to the first color image frame (such as the first RGB frame 302A) of the sequence of color image frames 302.

The control circuitry 202 may be further configured to determine the third foreground mask 306C based on a linear interpolation 310 of the first foreground mask 306A and the second foreground mask 306B. The control circuitry 202 may be further configured to compute an average of two mask frames, such as the first foreground mask 306A and the second foreground mask 306B by use of the linear interpolation 310. The computed average may correspond to a rough foreground mask, which may be the third foreground mask 306C.

In an embodiment, the second CNN 304B may be pre-trained for the refinement of the rough foreground mask, i.e. the third foreground mask 306C. In an alternate embodiment, the second CNN 304B may need to be trained on specific training data for refinement of the rough foreground mask, i.e. the third foreground mask 306C. Thus, the control circuitry 202 may be configured to generate the specific training data, i.e. a concatenated image frame that may include an intermediate RGB frame (such as the second RGB frame 302B) of the sequence of color image frames 302 concatenated with the third foreground mask 306C (i.e. the rough foreground mask). The concatenated image frame may be a 4-channel RGB-M image, where RGB may correspond to RGB color channels of the intermediate "RGB" frame and "M" may correspond to mask or binary colors (i.e. black and white) of the third foreground mask 306C. Also, the control circuitry 202 may be configured to generate an intermediate test mask by application of the first CNN 304A directly on the second RGB frame 302B (as discussed in FIG. 3B).

The control circuitry 202 may be further configured to train the second CNN 304B based on the intermediate test mask and an output of the partially or untrained version of the second CNN 304B. The intermediate test mask may act as a ground truth mask or a precise reference mask for estimation of optimal weight parameters of the second CNN 304B. In the training stage, with every output of the second CNN 304B, a training error may be minimized for the second CNN 304B based on differences in an estimated foreground mask of the second CNN 304B and the intermediate test mask. Once the training error is minimized, the second CNN 304B may be configured to output a fourth foreground mask 306D such that an accuracy of the second CNN 304B is almost same as that of the first CNN 304A, with less cycle time for generation of output as compared to the first CNN 304A. The fourth foreground mask 306D may be an accurate mask for the object-of-interest, such as the human object 308 for the intermediate RGB frame, such as the second RGB frame 302B. The details of the preparation of training data set for the second CNN 304B is described in detail, for example, in FIGS. 3B, 3C, and 3D.

The control circuitry 202 may be further configured to generate the fourth foreground mask 306D that represents a refined foreground mask of the third foreground mask 306C by use of the second CNN 304B. The second CNN 304B may be a computationally-light CNN that may output an accurate masks as the computationally-heavy CNN, such as the first CNN 304A. The comparable accuracy of the second CNN 304B may be achieved at the training stage of the second CNN 304B. The computationally-light CNN may denote that the second CNN 304B may have less cycle time and may be faster as compared to the first CNN 304A. The fourth foreground mask 306D may be generated based on an input of an intermediate color image frame (such as the second RGB frame 302B) and the determined third foreground mask 306C to the second CNN 304B.

As the second CNN 304B takes 4-channel image data that includes the third foreground mask 306C concatenated with the second RGB frame 302B as an RGB-M input, the cycle time is less as the 4th channel may correspond to a binary image representation in the form of the third foreground mask 306C (i.e. the rough foreground mask).

Figure 3B:
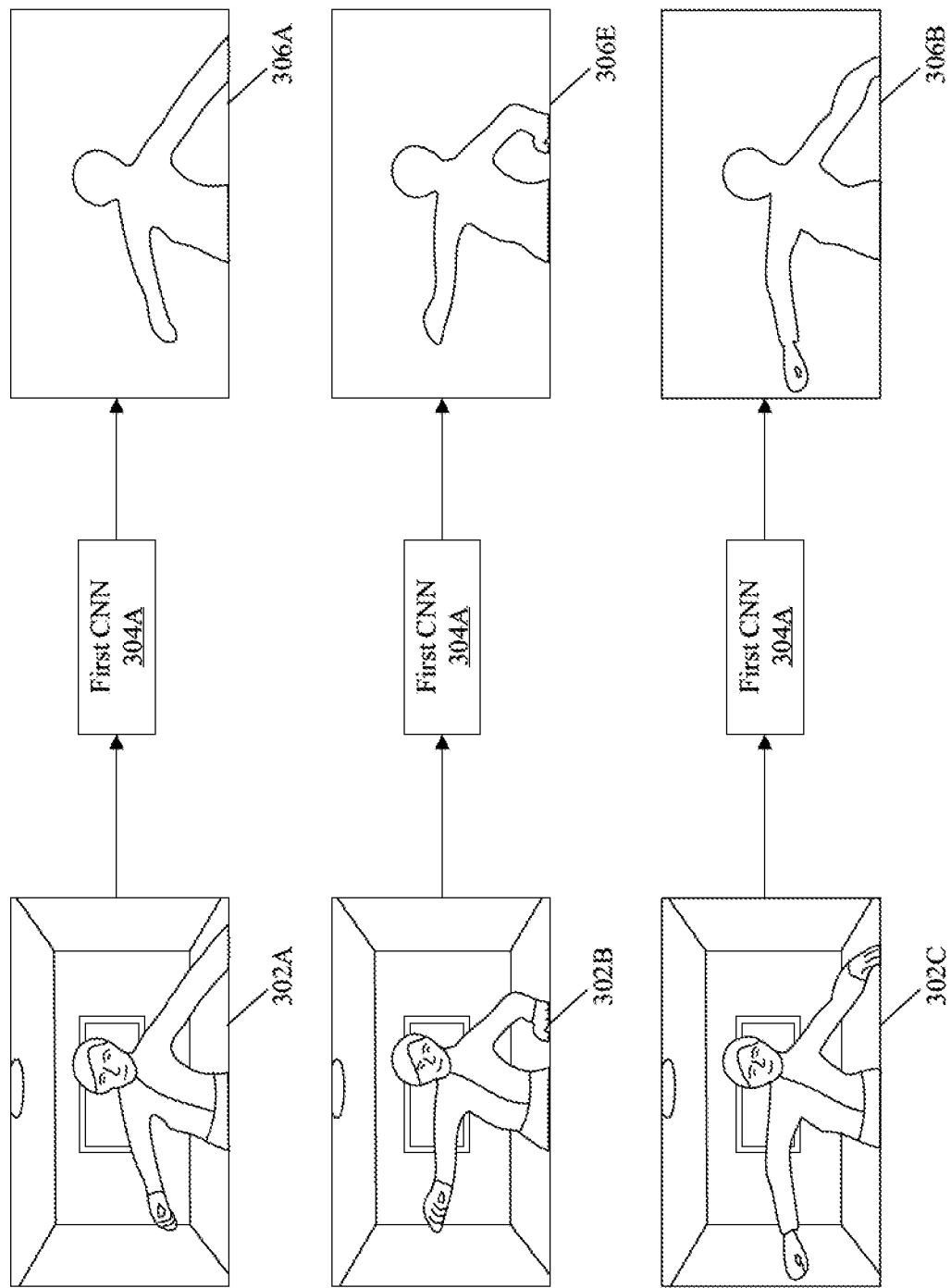
FIG. 3B illustrates an exemplary training dataset preparation for second CNN of FIG. 3A, in accordance with an embodiment of the disclosure.

FIG. 3B illustrates an exemplary training dataset preparation for the second CNN of FIG. 3A, in accordance with an embodiment of the disclosure. With reference to FIG. 3B, there is shown a set of frames, such as RGB frames 302A, 302B, and 302C, of the sequence of color image frames 302, the first CNN 304A, and different output foreground masks corresponding to each frame of the set of frames, such as the RGB frames 302A, 302B, and 302C.

In accordance with an embodiment, once the first CNN 304A and the different output foreground masks corresponding to each frame of the set of frames (such as the RGB frames 302A, 302B, and 302C) from the first CNN 304A are available, a training dataset for the second CNN 304B may be generated. The control circuitry 202 may be configured to train the first CNN 304A based on a plurality of input-output image pair of the first CNN 304A. The plurality of input-output image pairs of the first CNN 304A may include the first RGB frame 302A, the second RGB frame 302B, and the third RGB frame 302C and corresponding output foreground masks, such as the first foreground mask 306A, a foreground mask 306E, and the third foreground mask 306C. The foreground mask 306E may correspond to the intermediate test mask or the ground truth mask for the training of the second CNN 304B, i.e. the computationally-light CNN. Similarly, the control circuitry 202 may be configured to process at least some frames (i.e., a set of frames) or all the input RGB frames of the sequence of color image frames 302 with the first CNN 304A and generate a foreground mask for each input RGB frame of the sequence of color image frames 302.

The plurality of input-output image pair of the first CNN 304A that includes different input RGB frames and corresponding foreground mask for each input RGB frame of the sequence of color image frames 302 may be utilized as a training dataset for the second CNN 304B. Based on the plurality of input-output image pairs of the first CNN 304A, the training of the second CNN 304B may be efficient as a need to manually create the true foreground masks (also referred to as a ground truth for the second CNN 304B) may be avoided.

Figure 3C:
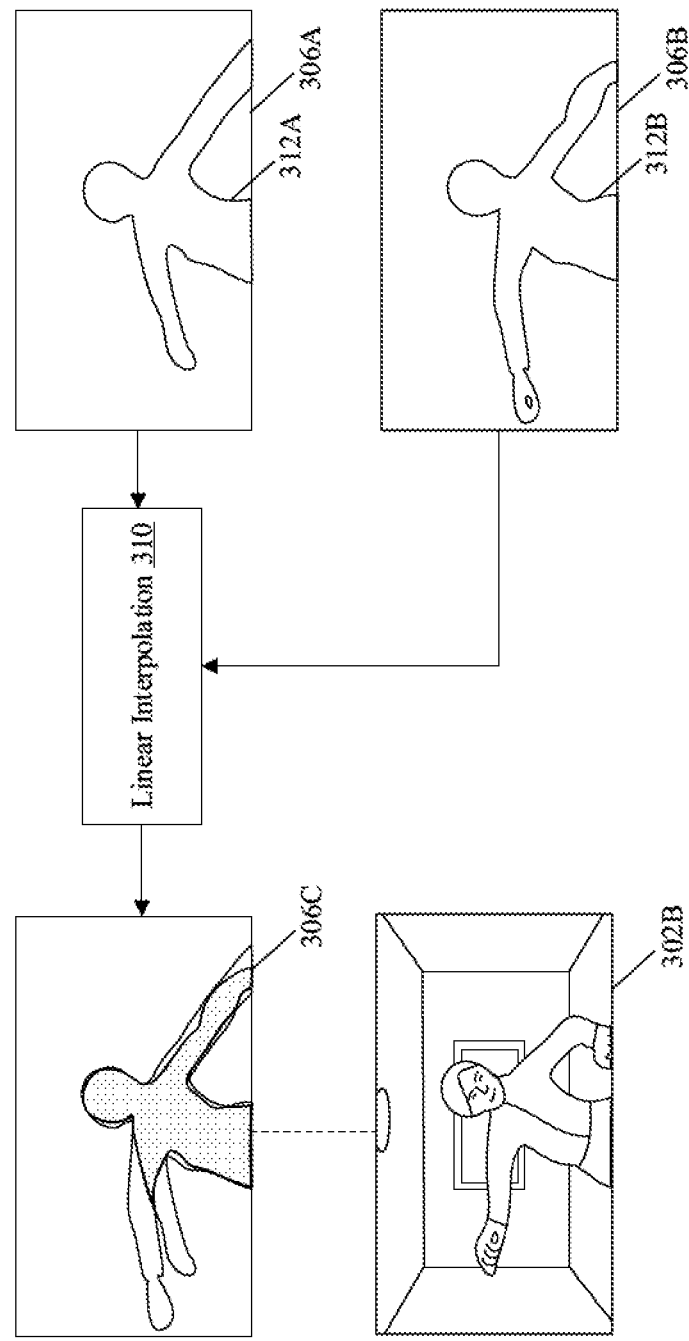
FIG. 3C illustrates an exemplary linear interpolation of two foreground masks, in accordance with an embodiment of the disclosure.

FIG. 3C illustrates an exemplary linear interpolation of two foreground masks, in accordance with an embodiment of the disclosure. With reference to FIG. 3C, there is shown the linear interpolation 310 of the first foreground mask 306A and the second foreground mask 306B that are generated by the first CNN 304A.

The control circuitry 202 may be configured to apply an approximation operation in which an object boundary of the object-of-interest, such as the human object 308, is approximated and normalized from a first object boundary 312A of the first foreground mask 306A and a second object boundary 312B of the second foreground mask 306B to generate the third foreground mask 306C. In the linear interpolation 310, an average of two mask frames, such as the first foreground mask 306A and the second foreground mask 306B, may be taken as a rough foreground mask, which may be the third foreground mask 306C. The common area between the first foreground mask 306A and the second foreground mask 306B is shown as dotted area. The area of the first foreground mask 306A and the second foreground mask 306B that is not common may be averaged or approximated.

Figure 3D:
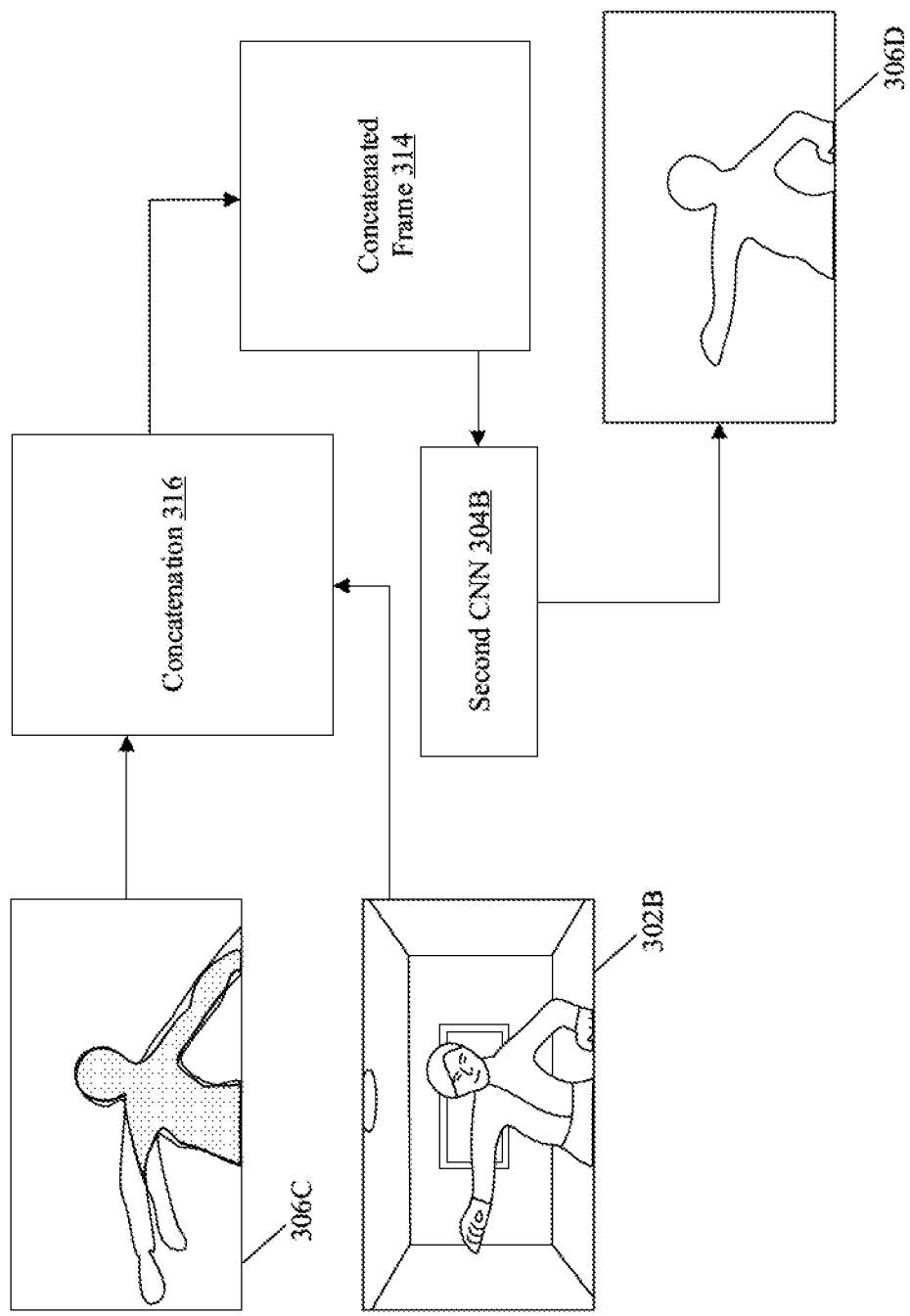
FIG. 3D illustrates an exemplary input to the second CNN of FIG. 3A to generate a foreground mask for an intermediate image frame, in accordance with an embodiment of the disclosure.

FIG. 3D illustrates an exemplary input to the second CNN of FIG. 3A to generate a foreground mask for an intermediate image frame, in accordance with an embodiment of the disclosure. With reference to FIG. 3D, there is shown the third foreground mask 306C (i.e. a rough foreground mask) for the second RGB frame 302B (i.e. an intermediate frame) between the first RGB frame 302A and the third RGB frame 302C. Also, a concatenated frame 314 is shown along with the fourth foreground mask 306D that is an update of the third foreground mask 306C.

In order to update the third foreground mask 306C to the fourth foreground mask 306D, the control circuitry 202 may be configured to generate the concatenated frame 314 by concatenation 316 of the second RGB frame 302B (such as a t+1 to frame between $t_{th}$ and t+$2_{th}$ frame) with the third foreground mask 306C (i.e. the rough foreground mask). The concatenated frame 314 may be a 4-channel image (i.e. RGB channels and a mask).

The control circuitry 202 may be further configured to train the second CNN 304B by using the concatenated frame 314 as an input to the second CNN 304B. The second CNN 304B may output a foreground mask in each iteration of a set of iterations for a set of weights that may be adjusted in the corresponding iteration based on a training error for the second CNN 304B. The second CNN 304B may be trained such that a difference between the output foreground mask from the second CNN 304B in each iteration and the foreground mask 306E (i.e. an intermediate test mask or ground truth mask generated by the first CNN 304A) is minimized. The foreground mask 306E (i.e. the intermediate test mask) may act as a ground truth mask or a precise reference mask for estimation of optimal weight parameters of the second CNN 304B. The minimization of the difference between the output foreground mask from the second CNN 304B in each iteration and the foreground mask 306E may correspond to a minimization of the training error for the second CNN 304B (i.e. a computationally-light CNN).

Once the training error is minimized, the control circuitry 202 may be configured to update, by use of the second CNN 304B, the third foreground mask 306C to the fourth foreground mask 306D. The fourth foreground mask 306D may represent the refined foreground mask of the third foreground mask 306C. The third foreground mask 306C may be updated to the fourth foreground mask 306D based on the third foreground mask 306C and the intermediate color image frame (i.e. the second RGB frame 302B that may lie between the first RGB frame 302A and the third RGB frame 302C). More specifically, the second CNN 304B may output the fourth foreground mask 306D such that an accuracy of the second CNN 304B is almost same as that of the first CNN 304A, with less cycle time for generation of the fourth foreground mask 306D as compared to the first CNN 304A. The fourth foreground mask 306D may be an accurate mask for the object-of-interest, such as the human object 308 for the second RGB frame 302B.

The object segmentation circuit 204 may be further configured to segment the object-of-interest (such as the human object 308) from at least the first RGB frame 302A by use of the first foreground mask 306A, the third RGB frame 302C by use of the second foreground mask 306B, and the second RGB frame 302B by use of the fourth foreground mask 306D.

Figure 4:
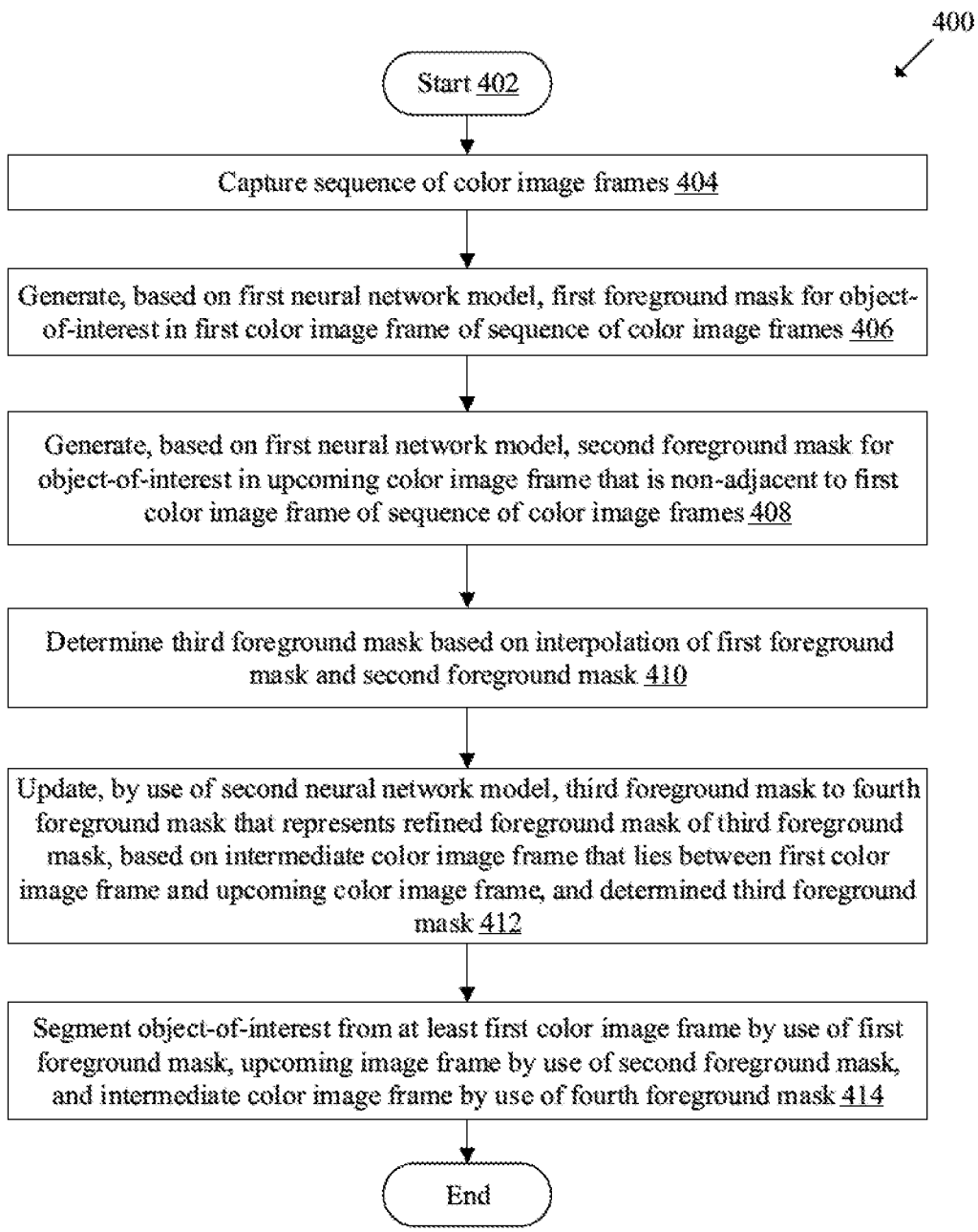
FIG. 4 is a flowchart that illustrates an exemplary method for object segmentation in a sequence of color image frames based on multiple neural networks, in accordance with an embodiment of the disclosure.

FIG. 4 is a flowchart that illustrates an exemplary method for object segmentation in a sequence of color image frames based on multiple neural networks, in accordance with an embodiment of the disclosure. With reference to FIG. 4, there is shown a flowchart 400. The operations of the exemplary method may be executed in the image-processing apparatus 102. The operations may start at 402 and proceed to 404.

At 404, the sequence of color image frames 110 may be captured. The control circuitry 202 may be configured to control the image sensor 102A to capture the sequence of color image frames 110.

At 406, a first foreground mask may be generated based on the first neural network model 112A, for the object-of-interest in the first color image frame 110A of the sequence of color image frames 110. The control circuitry 202 may be configured to generate, based on the first neural network model 112A, the first foreground mask for the object-of-interest in the first color image frame 110A of the sequence of color image frames 110.

At 408, a second foreground mask may be generated based on the first neural network model 112A, for the object-of-interest in the upcoming color image frame that is non-adjacent to the first color image frame 110A of the sequence of color image frames 110. The control circuitry 202 may be configured to generate, based on the first neural network model 112A, the second foreground mask for the object-of-interest in the upcoming color image frame that is non-adjacent to the first color image frame 110A of the sequence of color image frames 110.

At 410, a third foreground mask may be determined based on interpolation of the first foreground mask and the second foreground mask. The control circuitry 202 may be configured to determine the third foreground mask based on the interpolation of the first foreground mask and the second foreground mask. The interpolation may be a linear interpolation, where an average of the first foreground mask and the second foreground mask may yield the third foreground mask (a rough foreground mask).

At 412, the third foreground mask may be updated by use of the second neural network model 112B to a fourth foreground mask that may represent a refined foreground mask of the third foreground mask, based on the determined third foreground mask and an intermediate color image frame that lies between the first color image frame 110A and the upcoming color image frame. The control circuitry 202 may be configured to update, by use of the second neural network model 112B, the third foreground mask to the fourth foreground mask that may represent the refined foreground mask of the third foreground mask. The third foreground mask may be updated based on the determined third foreground mask and the intermediate color image frame that lies between the first color image frame 110A and the upcoming color image frame.

At 414, the object-of-interest may be segmented from at least the first color image frame 110A by use of the first foreground mask, the upcoming color image frame by use of the second foreground mask, and the intermediate color image frame by use of the fourth foreground mask. The control circuitry 202 may be configured to segment the object-of-interest from at least the first color image frame 110A by use of the first foreground mask, the upcoming color image frame by use of the second foreground mask, and the intermediate color image frame by use of the fourth foreground mask. Control passes to end.

Various embodiments of the disclosure may provide a non-transitory computer readable medium and/or storage medium having stored thereon, instructions executable by a machine and/or a computer to operate an image-processing apparatus for object segmentation in a sequence of color image frames based on multiple neural networks. The instructions may cause the machine and/or computer to perform operations that include a capture of the sequence of color image frames. The operations further include a storage of a first neural network model and a second neural network model. The operations further include generation of a first foreground mask based on the first neural network model, for an object-of-interest in the first color image frame of the sequence of color image frames. The operations further include generation of a second foreground mask based on the first neural network model, for the object-of-interest in an upcoming color image frame that is non-adjacent to the first color image frame of the sequence of color image frames. The operations further include determination of a third foreground mask based on interpolation of the first foreground mask and the second foreground mask. The operations further include an update of the third foreground mask by use of the second neural network model to a fourth foreground mask that represents a refined foreground mask of the third foreground mask. The third foreground mask is updated based on the determined third foreground mask and an intermediate color image frame that lies between the first color image frame and the upcoming color image frame. The operations further include segmentation of the object-of-interest from at least the first color image frame by use of the first foreground mask, the upcoming color image frame by use of the second foreground mask, and the intermediate color image frame by use of the fourth foreground mask.

Certain embodiments of the disclosure may be found in an image-processing apparatus and a method for object segmentation in a sequence of color image frames based on multiple neural networks. Various embodiments of the disclosure may provide the image-processing apparatus 102 (FIG. 1) that may include the memory 206 (FIG. 2)), the image sensor 102A, and the control circuitry 202 (FIG. 2). The image sensor 102A may be configured to capture the sequence of color image frames 110. The memory 206 may be configured to store the first neural network model 112A and the second neural network model 112B. The control circuitry 202 may be configured to generate, based on the first neural network model 112A, a first foreground mask for an object-of-interest in the first color image frame 110A of the sequence of color image frames 110. The control circuitry 202 may be further configured to generate, based on the first neural network model 112A, a second foreground mask for the object-of-interest in an upcoming color image frame that is non-adjacent to the first color image frame 110A of the sequence of color image frames 110. The control circuitry 202 may be further configured to determine a third foreground mask based on interpolation of the first foreground mask and the second foreground mask. The control circuitry 202 may be further configured to update, by use of the second neural network model 112B, the third foreground mask to a fourth foreground mask that represents a refined foreground mask of the third foreground mask. The third foreground mask may be updated based on the determined third foreground mask and an intermediate color image frame that lies between the first color image frame 110A and the upcoming color image frame. The control circuitry 202 may be further configured to segment the object-of-interest from at least the first color image frame 110A by use of the first foreground mask, the upcoming color image frame by use of the second foreground mask, and the intermediate color image frame by use of the fourth foreground mask.

In accordance with an embodiment, the first neural network model 112A may be a pre-trained model that is trained with a set of image pairs. Each image pair of the set of image pairs may include a color image frame and a foreground mask image. Each image pair may include at least the object-of-interest that is to be segmented.

In accordance with an embodiment, the control circuitry 202 may be configured to utilize the first neural network model 112A to estimate a foreground mask of the object-of-interest from an arbitrary input color image frame from the sequence of color image frames 110 independent of image information from one or more preceding color image frames or succeeding color image frames of the arbitrary input color image.

In accordance with an embodiment, the first neural network model 112A may be a first convolutional neural network and the second neural network model 112B may be a second convolutional neural network that is different from the first convolutional neural network. The first neural network model 112A may be different from the second neural network model 112B in at least a cycle time parameter. The cycle time parameter may indicate a total time to generate an output foreground mask for an input color image frame of the sequence of color image frames 110 when the input color image frame is passed through a neural network model. The second neural network model 112B has less cycle time and is faster as compared to the first neural network model 112A. In accordance with an embodiment, the control circuitry 202 may be configured to train the second neural network model 112B based on an input-output image pair of the first neural network model 112A.

In accordance with an embodiment, the control circuitry 202 may be configured to classify, based on the first neural network model 112A, the first color image frame 110A to a foreground region and a background region. The foreground region may be mapped to the generated first foreground mask that is a binary image.

In accordance with an embodiment, the control circuitry 202 may be further configured to classify, based on the first neural network model 112A, the upcoming color image frame to a foreground region and a background region. The foreground region may be mapped to the generated second foreground mask that is a binary image.

In accordance with an embodiment, the interpolation may be a linear interpolation of the first foreground mask and the second foreground mask. In the linear interpolation of the first foreground mask and the second foreground mask, the control circuitry 202 may be configured to apply an approximation operation in which an object boundary of the object-of-interest is approximated and normalized from a first object boundary of the first foreground mask and a second object boundary of the second foreground mask to generate the third foreground mask that is a binary image.

In accordance with an embodiment, the control circuitry 202 may be configured to segment the object-of-interest from a first set of non-consecutive frames of the sequence of color image frames 110 by use of different output foreground masks corresponding to each frame of the first set of non-consecutive frames generated based on the first neural network model 112A. The different output foreground masks may include at least the first foreground mask and the second foreground mask.

In accordance with an embodiment, the control circuitry 202 may be further configured to segment the object-of-interest from a second set of non-consecutive frames of the sequence the object-of-interest by use of different output foreground masks corresponding to each frame of the second set of non-consecutive frames generated based on the second neural network model 112B. The different output foreground masks may include at least the fourth foreground mask.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. An image-processing apparatus, comprising:
an image sensor configured to capture a sequence of color image frames;
a memory configured to store a first neural network model and a second neural network model; and
control circuitry configured to:
generate, based on the first neural network model, a first foreground mask for an object-of-interest in a first color image frame of the sequence of color image frames;
generate, based on the first neural network model, a second foreground mask for the object-of-interest in an upcoming color image frame that is non-adjacent to the first color image frame of the sequence of color image frames;
determine a third foreground mask based on interpolation of the first foreground mask and the second foreground mask;
update, by use of the second neural network model, the third foreground mask to a fourth foreground mask that represents a refined foreground mask of the third foreground mask, based on the determined third foreground mask and an intermediate color image frame that lies between the first color image frame and the upcoming color image frame; and segment the object-of-interest from at least the first color image frame by use of the first foreground mask, the upcoming color image frame by use of the second foreground mask, and the intermediate color image frame by use of the fourth foreground mask.

2. The image-processing apparatus according to claim 1, wherein the first neural network model is a pre-trained model that is trained with a set of image pairs, each image pair of the set of image pairs includes a color image frame and a foreground mask image, and each image pair includes the object-of-interest that is to be segmented.

3. The image-processing apparatus according to claim 1, wherein the control circuitry is further configured to utilize the first neural network model to estimate a foreground mask of the object-of-interest from an arbitrary input color image frame from the sequence of color image frames independent of image information from one of at least one preceding color image frame or succeeding color image frames of the arbitrary input color image frame.

4. The image-processing apparatus according to claim 1, wherein the first neural network model is a first convolution neural network, and the second neural network model is a second convolution neural network that is different from the first convolution neural network.

5. The image-processing apparatus according to claim 1, wherein the first neural network model is different from the second neural network model in at least a cycle time parameter, the cycle time parameter indicates a total time to generate an output foreground mask for an input color image frame of the sequence of color image frames when the input color image frame is passed through a neural network model, and the second neural network model has less cycle time and is faster as compared to the first neural network model.

6. The image-processing apparatus according to claim 5, wherein the control circuitry is further configured to train the second neural network model based on an input-output image pair of the first neural network model.

7. The image-processing apparatus according to claim 1, wherein the control circuitry is further configured to classify, based on the first neural network model, the first color image frame to a foreground region and a background region, and the foreground region is mapped to the generated first foreground mask that is a binary image.

8. The image-processing apparatus according to claim 1, wherein the control circuitry is further configured to classify, based on the first neural network model, the upcoming color image frame to a foreground region and a background region, and the foreground region is mapped to the generated second foreground mask that is a binary image.

9. The image-processing apparatus according to claim 1, wherein the interpolation includes a linear interpolation of the first foreground mask and the second foreground mask.

10. The image-processing apparatus according to claim 9, wherein in the linear interpolation of the first foreground mask and the second foreground mask, the control circuitry is further configured to apply an approximation operation in which an object boundary of the object-of-interest is approximated and normalized from a first object boundary of the first foreground mask and a second object boundary of the second foreground mask to generate the third foreground mask that is a binary image.

11. The image-processing apparatus according to claim 1, wherein the control circuitry is further configured to segment the object-of-interest from a first set of non-consecutive frames of the sequence of color image frames by use of different output foreground masks corresponding to each frame of the first set of non-consecutive frames generated based on the first neural network model, and the different output foreground masks include at least the first foreground mask and the second foreground mask.

12. The image-processing apparatus according to claim 11, wherein the control circuitry is further configured to segment the object-of-interest from a second set of non-consecutive frames of the sequence of color image frames by use of the different output foreground masks corresponding to each frame of the second set of non-consecutive frames generated based on the second neural network model, and the different output foreground masks include at least the fourth foreground mask.

13. A method, comprising:

in an image-processing apparatus comprising an image sensor, a memory that stores a first neural network model and a second neural network model, and control circuitry:

capturing, by the image sensor, a sequence of color image frames;

generating, by the control circuitry, a first foreground mask for an object-of-interest in a first color image frame of the sequence of color image frames based on the first neural network model;

generating, by the control circuitry, a second foreground mask for the object-of-interest in an upcoming color image frame that is non-adjacent to the first color image frame of the sequence of color image frames based on the first neural network model;

determining, by the control circuitry, a third foreground mask based on interpolation of the first foreground mask and the second foreground mask;

updating, by the control circuitry, the third foreground mask to a fourth foreground mask that represents a refined foreground mask of the third foreground mask by use of the second neural network model that is different than the first neural network model, based on the third foreground mask generated based on the interpolation and an intermediate color image frame that lies between the first color image frame and the upcoming color image frame; and segmenting, by the control circuitry, the object-of-interest from at least the first color image frame by use of the first foreground mask, the upcoming color image frame by use of the second foreground mask, and the intermediate color image frame by use of the fourth foreground mask.

14. The method according to claim 13, wherein
the first neural network model is a pre-trained model that is trained with a set of image pairs,
each image pair of the set of image pairs includes a color image frame and a foreground mask image, and
each image pair includes the object-of-interest that is to be segmented.

15. The method according to claim 13, further comprising estimating, by the control circuitry, based on the first neural network model, a foreground mask of the object-of-interest from an arbitrary input color image frame from the sequence of color image frames independent of image information from one of at least one preceding color image frame or succeeding color image frames of the arbitrary input color image frame.

16. The method according to claim 13, wherein
the first neural network model is a first convolution neural network, and
the second neural network model is a second convolution neural network that is different from the first convolution neural network.

17. The method according to claim 13, wherein
the first neural network model is different from the second neural network model in at least a cycle time parameter,
the cycle time parameter indicates a total time to generate an output foreground mask for an input color image frame of the sequence of color image frames when the input color image frame is passed through a neural network model, and
the second neural network model has less cycle time and is faster as compared to the first neural network model.

18. The method according to claim 13, further comprising training, by the control circuitry, the second neural network model based on an input-output image pair of the first neural network model.

19. The method according to claim 13, further comprising classifying, by the control circuitry, the first color image frame to a foreground region and a background region by use of the first neural network model, wherein the foreground region is mapped to the generated first foreground mask that is a binary image.

20. The method according to claim 13, wherein
the interpolation includes a linear interpolation of the first foreground mask and the second foreground mask.

* * * * *